Dec. 30, 1930.      N. D. ANOSTCHENKO      1,786,977
MOTION PICTURE APPARATUS
Filed May 6, 1929
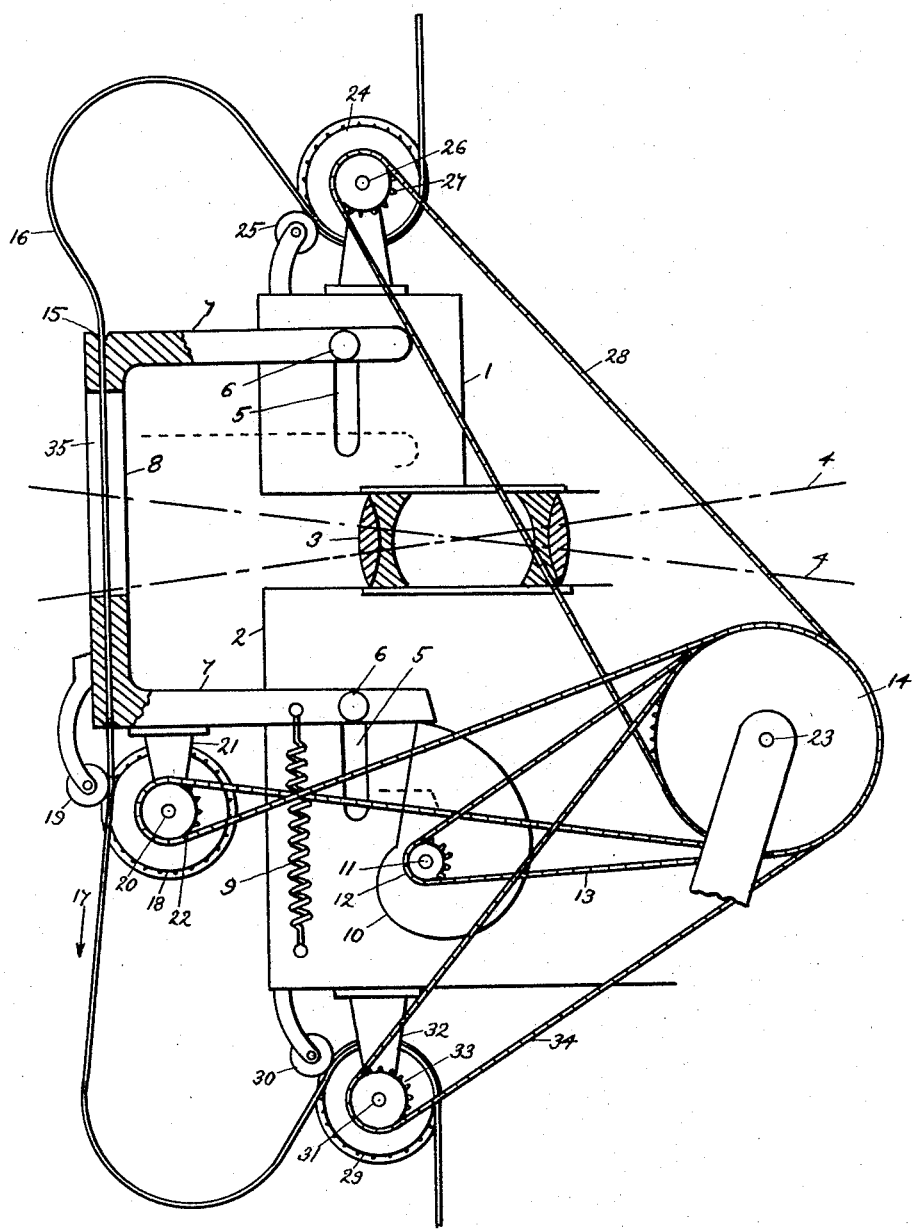
NIKOLAI D. ANOSTCHENKO
INVENTOR
BY John P. Nikonow
ATTORNEY Patented Dec. 30, 1930

1,786,977

UNITED STATES PATENT OFFICE

NIKOLAI D. ANOSTCHENKO, OF MOSCOW, UNION OF SOCIALIST SOVIET REPUBLICS

MOTION-PICTURE APPARATUS

Application filed May 6, 1929, Serial No. 360,923, and in the Union of Socialist Soviet Republics April 28, 1928.

My invention relates to motion picture apparatus and has a particular reference to apparatus adapted for projecting motion pictures from a moving film.

In ordinary projecting apparatus the film is moved intermittently, starting and stopping at a rapid rate of speed, not less than 16 times per second. Such intermittent movement is very injurious to the film, causing its rapid wear and even breakage during the performance.

In my apparatus I provide a mechanism whereby the film is moved continuously forming a loose loop between the rotating rolls. The middle portion of the loop in front of an objective lens is slidably fitted in a frame to which a reciprocating motion is imparted. The result of the two motions,—of the film itself and of the frame,—is such that the film actually stands still part of the time and moves at a double speed the other time. The difference in speed between the film in the frame and the portions in the propelling rollers is taken care of by the flexure of the loop or loops formed on both sides of the frame.

The operating mechanism is thereby simplified and the life of the film is considerably extended, as it is not subjected to the jerky motion like in ordinary projecting cameras.

My invention is more fully described in the accompanying specification and drawing which represents diagrammatically the main operating portion of my apparatus in a sectional elevation.

My apparatus consists of frame members 1 and 2 supporting an objective lens 3 on which rays 4 from a source of light (not shown) are directed. The members 1 and 2 have slots 5 for pins 6 attached to arms 7 of a sliding frame 8. A spring 9 tends to pull the frame 8 down. A cam 10 is rotatively mounted on a shaft 11 with a sprocket 12 connected by a chain 13 with a driving sprocket wheel 14.

The front portion of the frame 8 has a slot 15 for a strip of film 16 which is being moved down (in direction of an arrow 17) by means of a driving wheel or roller 18 with teeth adapted to fit in the regular slots with which all motion picture films are provided. A small roller 19 keeps the film pressed against the driving wheel 18. The wheel 18 is mounted on a shaft 20 supported in bearing brackets 21. A sprocket 22 is attached to the end of the shaft 20 and is connected by a chain with a driving sprocket 14, there being several sprockets 14 mounted side by side on the same shaft 23.

The upper end of the film 16 is moved by a wheel 24 with teeth to which the film is pressed by a roller 25. The wheel 24 is mounted on a shaft 26 with a sprocket 27 connected by a chain 28 with a driving sprocket 14.

The lower portion of the film 16 is placed on a wheel 29 with teeth against which it is pressed by a roller 30. It is mounted on a shaft 31 in bearing brackets 32 and provided with a sprocket 33 connected by a chain 34 with a driving sprocket 14.

The sprockets 14 are all of the same size, also the wheels 18, 24 and 29 are of the same size, and the sprockets 22, 27 and 33, so that the wheels 18, 24 and 29 rotate at the same speed, giving the film 16 a uniform and continuous progressive movement.

The frame 8 has a window 35 in front for the beam of light 4—4, the height of this window being about twice the width of the beam of light falling on the film.

The operation of my device is as follows.

The film 16 is placed on the wheels 18, 24 and 29 so as to form slack loops above and below the frame 8 as shown on the drawing. The sprockets 14 are then rotated by means of a constant speed motor thereby causing a continuous and uniform rotation of the wheels 18, 24 and 29, propelling the film at a constant rate of speed. The cam 10 is also rotated, intermittently raising and lowering the frame 8. This cam is shaped so that the amount of lift of the frame 8 equals the width of the beam of light 4—4 where it falls on the film 16. The cam is curved so that the frame 8 is being lifted at a constant rate of speed, the sprocket 12 being of such size that the speed of the lifting of the frame 8 equals the speed with which the film 16 is drawn through the slot 15 in the window 35. The cam 10 is cut off at the point next to its highest tip so that the end of the lower arm 7 slides off the cam when the highest point is reached and rapidly drops to the lowest point being pulled down by the spring 9.

The result of these combined movements is that the place on the film covered by the beam of light 4—4 remains stationary for a period of time when the frame 8 is being raised by the cam 10. This period corresponds to the time when the shutter (not shown) of an ordinary construction exposes the beam of light to be projected on a screen.

The rapid downward movement of the frame 8 with the film corresponds to the time when the shutter shuts off the beam of light leaving the screen dark. This period of darkness is twice as short as the time of exposure, as the speeds of the film and of the frame 8 are combined or added. This speed may be also made considerably greater depending on the shape of the cam 10.

It is evident, therefore, that with my mechanism the same effect is produced as with ordinary intermittent motion for the film, although the latter is moved by the wheels rotating at a continuous and uniform speed. The middle portion of the film only oscillates up and down, this movement causing the upper and lower loops of the film to bend or to change their curvature by following these oscillations. Such bending cannot possibly injure the film which is made of a very flexible material.

Important advantages of my invention are that the jerky intermittent motion for the film is avoided, and the film instead is subjected to a smooth and continuous movement combined with a flexure of its loose portions, also that the mechanism is thereby simplified.

I claim as my invention:

1. In a motion picture apparatus, the combination with a projecting camera, of a frame slidably supported in said camera, a wheel supported on said frame and adapted to move a film through said frame, means to reciprocate said frame with said film and with said wheel, wheels on said camera above and below said frame for said film, means to drive all of said wheels at a uniform rate of speed, said film forming free loops above and below said frame between said wheels, the speed of the operating movement of said frame being equal and opposite to the speed of said film, and a stationary lens adapted to direct a beam of light against said film in said frame, said frame being provided with a window of approximately double the width of said light beam.

2. In a motion picture apparatus, the combination with a projecting camera, of a frame slidably supported in said camera, a wheel supported on said frame and adapted to move a film through said frame, wheels on said camera above and below said frame, means to reciprocate said frame with said wheel, said film being adapted to form free loops above and below said frame between said camera wheels, a stationary lens adapted to throw a beam of light against said film in said frame, said frame being provided with a window for said film of about double the width of said beam, means to rotate said camera wheels at a uniform rate of speed thereby moving said film, and a flexible driving connection for said frame wheel adapted to rotate said frame wheel with the same peripheral speed as said camera wheels, the speed of said film being equal and opposite to the operating speed of said frame.

Signed at the city of Riga, in the Republic of Latvia, this third day of April, A. D. 1929.

NIKOLAI D. ANOSTCHENKO.